United States Patent [19]

Pate et al.

[11] Patent Number: 4,495,970
[45] Date of Patent: Jan. 29, 1985

[54] LARGE DIAMETER PLASTIC PIPE

[75] Inventors: Harold T. Pate, Solon, Ohio; William R. Laney, Tecumseh; Donald H. Shell, Bethany, both of Okla.

[73] Assignee: Thyssen-Bornemisza Inc., New York, N.Y.

[21] Appl. No.: 485,865

[22] Filed: Apr. 18, 1983

[51] Int. Cl.$^3$ .............................................. F16L 9/18
[52] U.S. Cl. ................................... 138/148; 138/152
[58] Field of Search ............... 138/121, 128, 142, 152, 138/153, 141, 148

[56] References Cited

U.S. PATENT DOCUMENTS

| | | | |
|---|---|---|---|
| 1,049,544 | 1/1913 | Smith | 138/152 X |
| 1,949,984 | 3/1934 | Walker | 138/152 X |
| 2,898,941 | 8/1959 | Kilcup | 138/121 |
| 3,058,861 | 10/1962 | Rutter | 138/121 |
| 3,077,661 | 2/1963 | Fromson | 138/142 X |
| 3,204,666 | 9/1965 | Lindsay et al. | 138/142 X |
| 3,715,454 | 2/1973 | Kleykamp | 138/121 X |
| 4,037,626 | 7/1977 | Roberts, Jr. | 138/121 X |
| 4,129,152 | 12/1978 | Davis | 138/121 X |
| 4,312,383 | 1/1982 | Kleykamp | 138/121 X |

Primary Examiner—Stephen Marcus
Assistant Examiner—Mark Thronson
Attorney, Agent, or Firm—William R. Laney

[57] ABSTRACT

A synthetic resin pipe which includes two identical complementary, extruded semi-cylinders joined by electromagnetic bonding along abutting longitudinal edges to form a smooth walled cylindrical pipe. In one embodiment of the invention, the smooth walled pipe forms an internal sleeve or liner within an external corrugated pipe having contiguous circumferential corrugations over its length, and having the troughs of the corrugations bonded to the outer surface of the internal sleeve.

In the method for forming the pipe, two identical flat plastic sheets are extruded, then vacuumed formed into semi-cylinders each having radially outwardly projecting longitudinal flanges extending from opposite side edges thereof. A paste or dispersion containing ferromagnetic particles is then applied to the flanges on the sides thereof adjacent the concavity of the respective semi-cylinder. The semi-cylinders are next arranged in registry to form a cylinder with the flanges abutting. Radio frequency electromagnetic radiation is then directed through the semi-cylinders at the location of the ferro-magnetic particles to fuse the semi-cylinders to each other adjacent the flanges. The flanges are then sheared away along shear lines tangential to the cylindrical side wall of the pipe thus formed.

10 Claims, 23 Drawing Figures

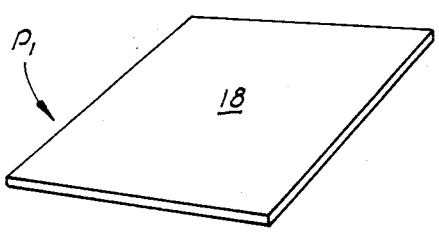
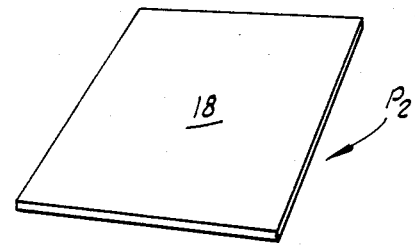
FIG. 2
FIG. 4
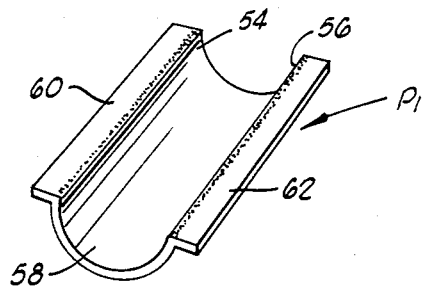
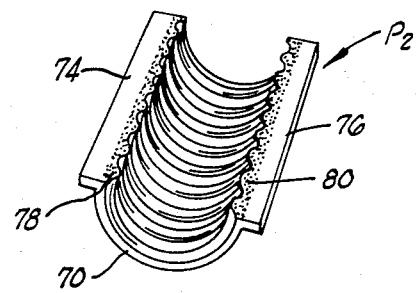
FIG. 3
FIG. 5
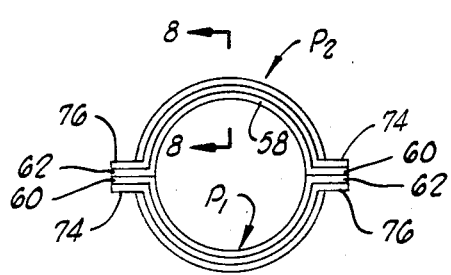
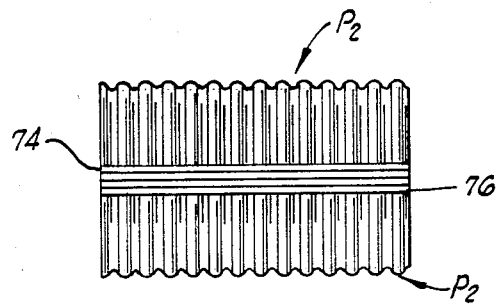
FIG. 6
FIG. 7
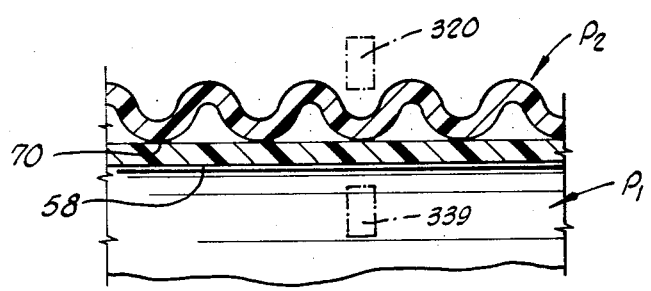
FIG. 8

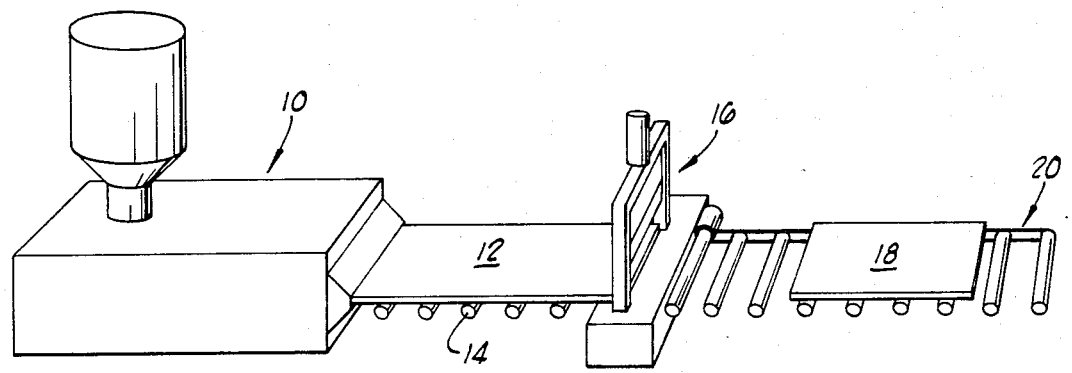
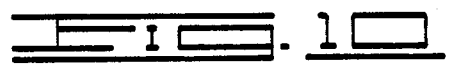
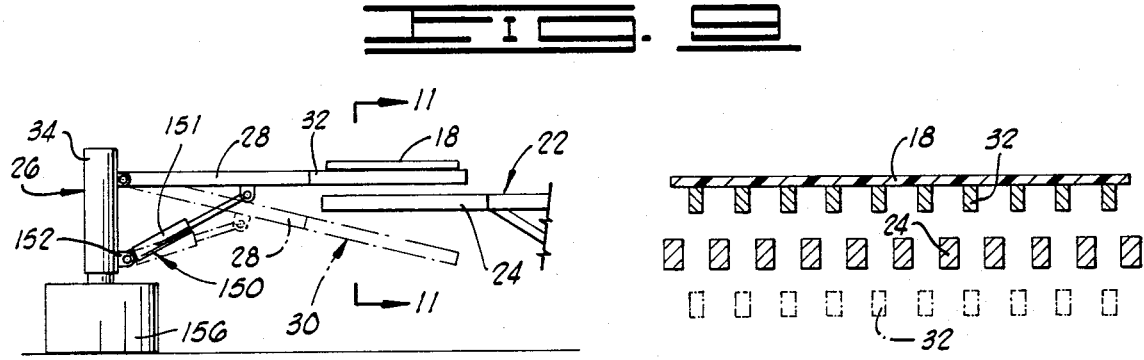
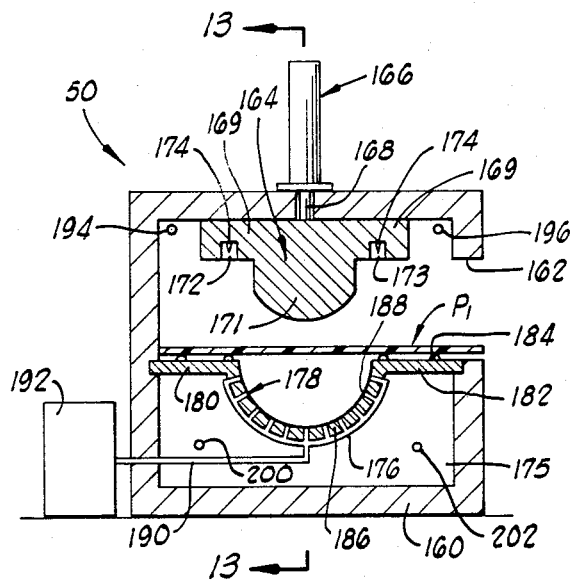
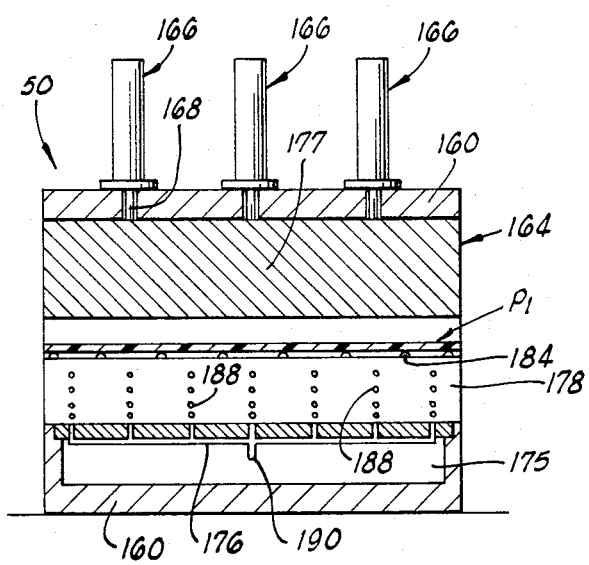
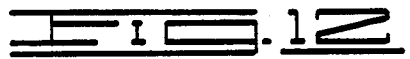
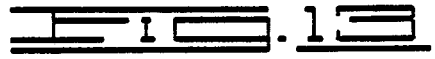

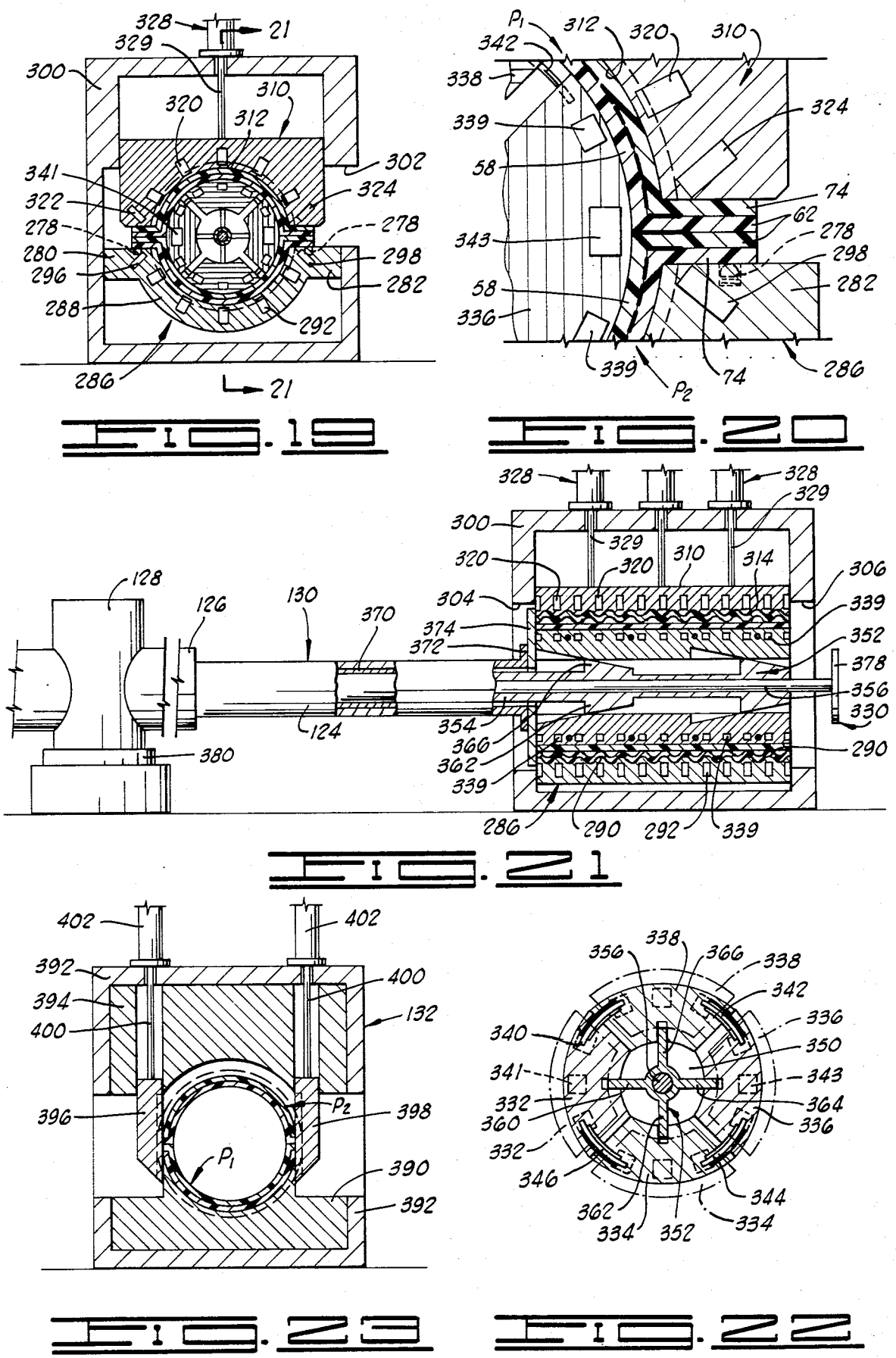

LARGE DIAMETER PLASTIC PIPE

FIELD OF THE INVENTION

This invention relates to large diameter plastic pipe, and more particularly, to synthetic resin pipe formed in multiple parts which are then joined together by electromagnetic bonding techniques. The pipe may be, with slight variation in the process of fabrication, formed as a single-walled large diameter pipe or as a double-walled large diameter pipe.

BRIEF DESCRIPTION OF THE PRIOR ART

Various techniques for forming thermoplastic materials to provide three-dimensional shaped articles are conventional and well known in the art. Such techniques include extrusion to form various extruded shapes, injection and blow molding to form various configurations of molded articles and vacuum forming. Plastic parts so formed have been joined to each other in various fabrication processes by the utilization of a number of different joining techniques. These include the use of suitable adhesives, mechanical interlocks and joinder effected by ultrasonic welding or electromagnetic fusion.

Over the last thirty years, plastic tubes, pipes and conduit have been increasingly used in place of such articles previously made of various metals, such as copper, steel, cast iron and the like. It is possible to quite effectively extrude plastic tubing of substantial mechanical strength for such purposes as wiring conduits and relatively small diameter fluid conveying pipe lines. Sewer pipe has also been extruded up to diameters of about 20 inches, and such pipe has functioned effectively, although the mechanical strength of sewer pipe of that diameter is generally somewhat less than that of steel, and in any event, requires that the wall thickness of the pipe be relatively great to afford adequate strength. Many utilizations of larger diameter plastic pipe are potentially in prospect if such pipe could be developed with proper symmetry and strength. One technique which has been relatively recently proposed for manufacturing relatively large diameter pipe from thermoplastics has entailed the extrusion of strips or bands or sheets or plastic material which are then, while relatively soft and formable, directed in a spiral path about a mandrel, with the lateral edges of the strips or bands abutting or overlapped to form a spiral wound, relatively large diameter pipe. The abutting or overlapped edges of the strips are then joined to each other by various methods, including mechanical interlocking, use of various adhesives and by fusion bonding. Spiral wound pipes of this type are illustrated and described, for example in Petsatakis U.S. Pat. No. 3,917,500; in U.S. Pat. No. 4,167,645; in Winstead U.S. Pat. No. 2,748,805; in Slaughter U.S. Pat. No. 2,354,485; in Rinker U.S. Pat. No. 3,706,624; in Lykle U.S. Pat. No. 3,542,078; in Cothran U.S. Pat. No. 4,291,728; in Wienand et al U.S. Pat. No. 3,606,670; in U.S. Pat. No. 4,209,043; in Richitelli U.S. Pat. No. 3,199,541 and Bradt U.S. Pat. No. 4,078,957.

Another technique which has been used to manufacture pipe and tubing is that which is illustrated and described in Luke U.S. Pat. No. 4,199,314 where extrusion coupled with blow molding is utilized. In Lupke et al U.S. Pat. No. 4,226,580 both blow molding and vacuum forming are used in conjunction with extrusion to form a pipe. A similar system is shown in Lupke et al U.S. Pat. No. 4,292,014. The blow-molding extrusion technique is also illustrated and described in Lupke et al U.S. Pat. No. 4,136,143 and Lupke et al U.S. Pat. No. 4,165,214. Corrugated tubing made by tubular extrusion followed by blow molding is also described in Bauman et al U.S. Pat. No. 3,605,817 and Stefanka U.S. Pat. No. 3,7143,311. In U.S. Pat. No. 3,913,622 a corrugated gas conduit is described as being made by a combination of the extrusion and vacuum forming techniques.

Various types of double-walled pipe or conduit have also previously been manufactured. In some of these, a smooth internal cylindrical wall is provided which is concentrically surrounded by a corrugated external sleeve or element. This type of pipe is generally of relatively high mechanical strength, and is useful for a number of purposes. Pipe of this sort is shown in U.S. Pat. No. 4,305,703 to Lupke; U.S. Pat. No. 4,226,580 to Lupke et al; German Pat. No. 1,966,018; Bauman et al U.S. Pat. No. 3,640,312 and Fochler U.S. Pat. No. 3,330,303. Dual-walled sewer pipe sold by Fabriks A.B. of Tristad, Sweden and having a corrugated outer shell is manufactured by a co-extrusion technique.

In some of the pipe structures made by spiral winding in the manner described, followed by joinder at various seam lines along the pipe, (either along axial lines or along spiral lines), the type of bonding or joining of sections of the pipe to each other leave unsightly sprue or weld lines or, in many instances, leave lines of weakness at which the pipe fractures or ruptures during extended periods of heavy duty usage.

GENERAL DESCRIPTION OF THE PRESENT INVENTION

The present invention provides an improved large diameter plastic pipe structure which has good mechanical strength properties, is symmetical and of constant roundness over its length, and which can be fabricated by the use of a unique combination of known techniques and steps. The invention further relates to the method of making such large diameter pipe, and to the system employed in the fabrication of the pipe.

Broadly described, the large diameter pipe of the invention includes a pair of identical, extruded semi-cylinders which are joined along the abutting edges of the cylinders lying in a diametric plane, so as to form a smooth-walled cylindrical pipe. Joinder or bonding of the semi-cylinders to each other is effected by electromagnetic bonding along the abutting longitudinal edges. In one embodiment of the invention, this smooth-walled pipe, formed of joined semi-cylinders, forms an internal sleeve or liner, and an external corrugated pipe element is then concentrically positioned about the internal liner. The external corrugated pipe is characterized in having a plurality of circumferential contiguous corrugations over its length, with the troughs of these corrugations bonded to the smooth outer surface of the internal sleeve, also by electromagnetic bonding.

In the process or method for forming the pipe, two identical flat plastic sheets are initially extruded, then vacuum formed into semi-cylinders each having radially outwardly projecting longitudinal flanges extending from opposite side edges thereof. A paste or dispersion containing susceptor particles, which particles are susceptible to heat generation upon impingement thereupon of high frequency electromagnetic radiation, is applied to the flanges on the two semi-cylindrical sections on the sides of the flanges which are adjacent the concavity of the respective semi-cylinder. The semi-cylinders are then arranged in registry to form a cylinder, with the radially projecting flanges of the two semi-cylinders in abutting contact. High frequency electromagnetic radiation is then directed through the semi-cylinders at the location of the susceptor particles to fuse the semi-cylinders to each other adjacent the flanges. The flanges are then sheared away along shear lines tangential to the cylindrical side wall of the pipe thus formed.

Where a compound or double-walled pipe is to be fabricated, and the external pipe element is corrugated, the radially inner surfaces of the troughs of the corrugations of the external pipe element are coated with the dispersion containing the susceptor particles, and during the electromagnetic bonding, high frequency radiation is directed through the parts of the inner liner and outer corrugated pipe element where the troughs of the corrugated external element abut the smooth external wall of the inner liner.

In carrying out the vacuum forming step of the invention, the general principles which are described in Haag U.S. Pat. No. 3,854,860, issued Dec. 17, 1974, are employed for shaping and forming the semi-cylinders from the extruded sheets or panels of plastic, including the formation of the two semi-cylinders of the external corrugated pipe elements where a double-walled large diameter pipe is to be formed. The teachings and disclosure of the Haag patent are incorporated herein by reference, as are the vacuum forming techniques and apparatus described in Lupke et al U.S. Pat. Nos. 4,226,580 and 4,292,014 and U.S. Pat. No. 3,913,622. Another patent constituting prior art with reference to the step of the vacuum forming of the plastic sheets is Lemelson U.S. Pat. No. 4,056,344.

With respect to the electromagnetic bonding of the several pipe elements to each other, the development and use of the paste or viscous liquid material containing the susceptor particles can follow the teachings described in Guglielmo et al U.S. Pat. Nos. 3,620,875 and 3,620,870 both issued Nov. 16, 1971, and also can be developed in accordance with the teaching as to the use of anti-ferro-magnetic particles to be found in White U.S. Pat. No. 3,391,846 issued July 9, 1968. The teachings and disclosure of Heller et al U.S. Pat. No. 4,067,765 issued Jan. 10, 1978 as to the development of semi-liquid matrices containing electromagnetically responsive susceptor particles is also incorporated herein by reference along with the Guglielmo et al patents and the White patent.

As to both the use of the semi-liquid matrix containing susceptor particles, and the placement of the necessary induction coils and heating elements to effect electromagnetic bonding, reference is also made to the publication "Design Criteria—Electromagnetic Welding of Thermoplastics" by Mark Choskazian, a publication of Ema-bond, Inc. of Norwood, N.J.

Other prior art which makes reference to techniques which are useful in electromagnetic bonding include U.S. Pat. No. 3,651,299 to O'Neil; U.S. Pat. No. 4,035,547 to Heller et al; U.S. Pat. No. 3,574,031 to Heller et al; U.S. Pat. No. 3,941,641 to Heller et al and U.S. Pat. No. 3,528,867. James U.S. Pat. No. 3,709,775 issued June 9, 1973 is also of pertinence for its teaching of the use of susceptor particles contained in paste and used for bonding of thermoplastics by the impingement of radio frequency electromagnetic waves on the susceptor particles in the paste.

As to the overall procedure of heating the flat extruded plastic sheets and thermoforming them, all by the use of an automated system, reference is made to the publication entitled "Decorating Rigid Components by Thermoforming" by W. P. Winton, dated Nov. 12, 1974, and constituting a publication of Brown Machine Division of the Koehring Company.

An important object of the present invention is to provide a high strength, large diameter plastic pipe having smooth external and internal walls.

A further object of the invention is to provide a system and a method for fabricating large diameter pipe by vacuum forming and electromagnetic bonding techniques, which pipe has neat and scarcely perceptible bond lines at the lines along which semi-cylindrical pipe sections are bonded to each other to form a large diameter cylindrical pipe of uniform diameter over its entire length.

Additional objects and advantages of the invention will become apparent from the following detailed description of the invention in which the pipe fabricated, the method employed, and the system used, in preferred embodiments of the invention, are described in detail.

GENERAL DESCRIPTION OF THE DRAWINGS

FIGS. 2–5 are perspective views illustrating the appearance of a pair of extruded plastic panels which are shaped and formed in the system illustrated in FIG. 1 to two basic configurations of semi-cylindrical plastic members, illustrated in FIGS. 3 and 5, which are joined with two like members to make up a final synthetic resin pipe constructed in accordance with one embodiment of the invention.

FIGS. 6 and 7 illustrate one embodiment of a large diameter double-walled plastic pipe made in accordance with the invention, but showing the pipe prior to shearing away certain side flanges developed in the pipe forming process.

FIG. 8 is a sectional view taken along line 8—8 of FIG. 6, and showing, in dashed lines, certain radio frequency heating elements.

FIG. 9 is a perspective view of an extrusion and shearing apparatus which is utilized for forming flat plastic panels employed in the process of making the large diameter pipe of the invention.

Figure 1:
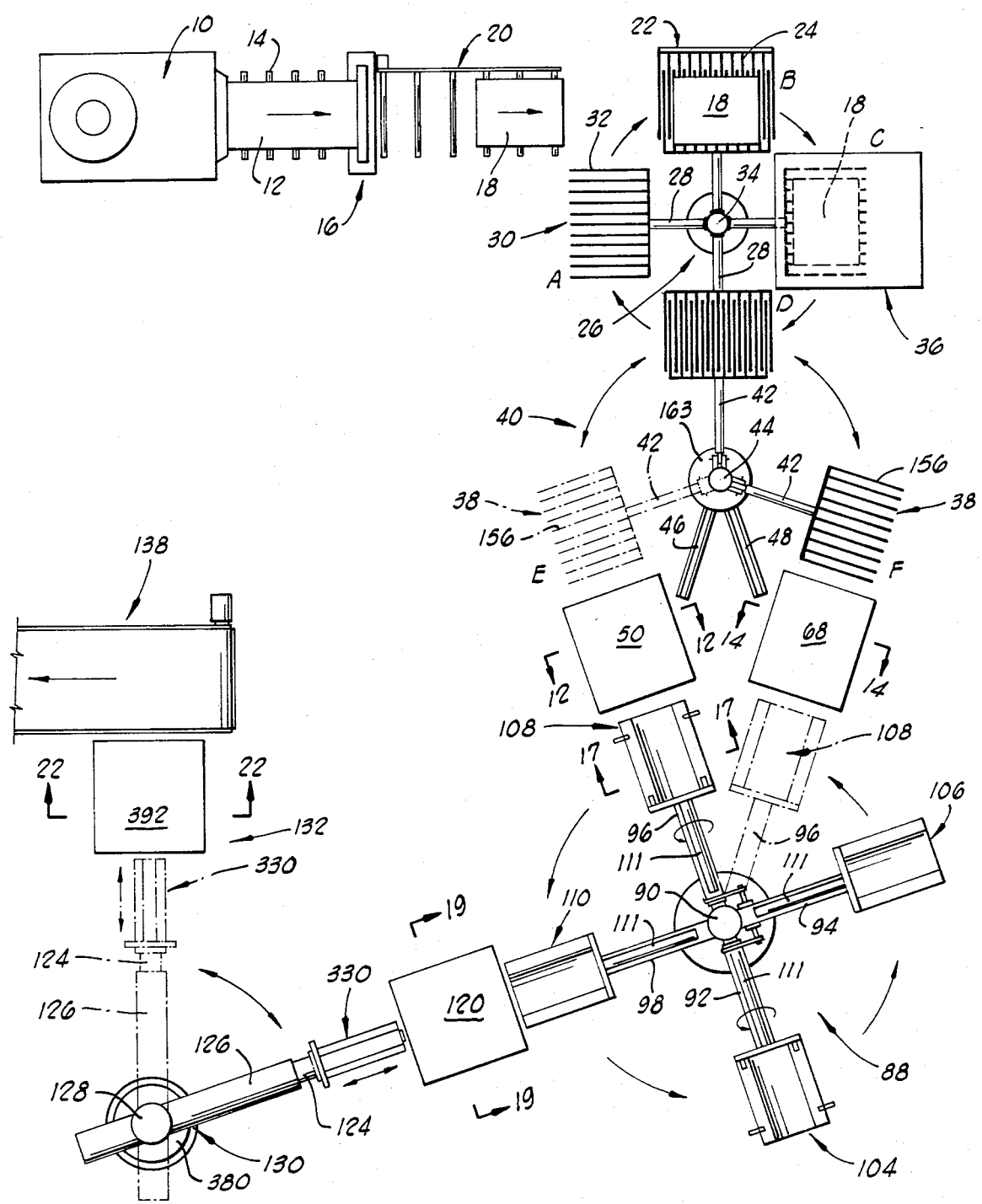
FIG. 1 is a schematic plan view of the system utilized for manufacturing a synthetic resin pipe constructed in accordance with the present invention.

FIG. 10 is a side elevation view illustrating a hydraulically operated lifting and transporting device forming a part of the system illustrated in FIG. 1, and showing in dashed lines, the status of the lifting and transporting device prior to the time that it lifts an extruded panel of plastic from a supporting structure preparatory to transporting it to a heating chamber, and showing the lifting and transporting device in full lines after it has lifted the sheet and is ready to transport it to the heating chamber.

FIG. 11 is a sectional view taken along line 11—11 on FIG. 10.

FIG. 12 is a sectional view taken along line 12—12 on FIG. 1, and depicting the interior of a first heated vacuum forming chamber in which alternate ones of the extruded sheets of synthetic resin are located by means of the displacement and loading apparatus or subassembly illustrated in FIG. 1.

FIG. 13 is a sectional view taken along line 13—13 on FIG. 12.

Figures 14, 15:
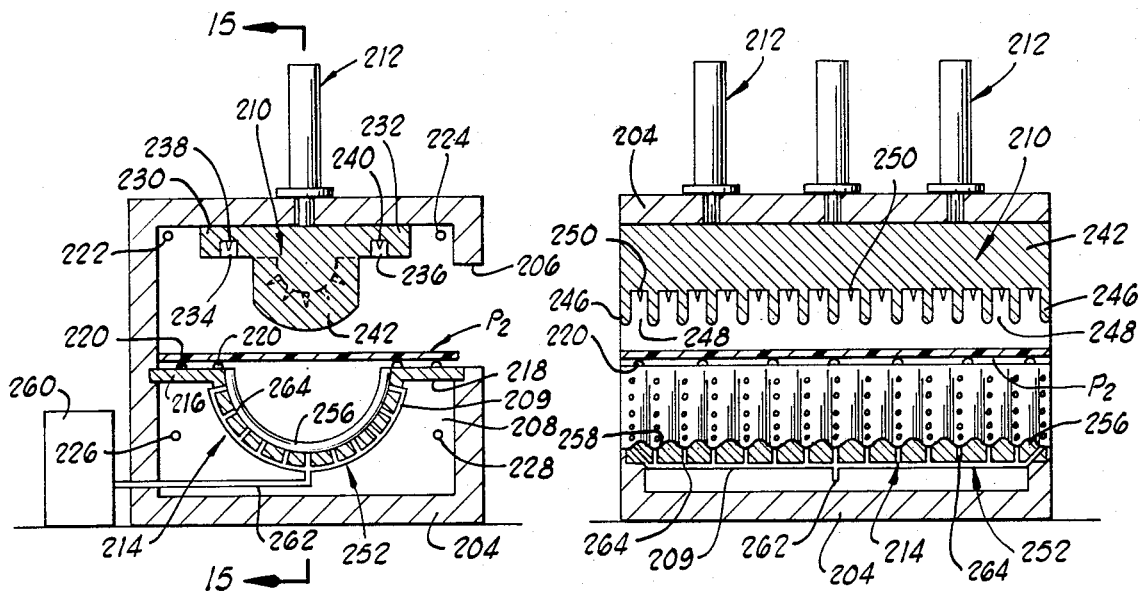

FIG. 14 is a sectional view taken along line 14—14 on FIG. 1, and illustrating the interior of a second heated vacuum forming chamber employed in vacuum forming alternate extruded sheets of synthetic resin placed therein by the apparatus depicted in FIG. 1.

FIG. 15 is a sectional view taken along line 15—15 on FIG. 14.

Figure 16:
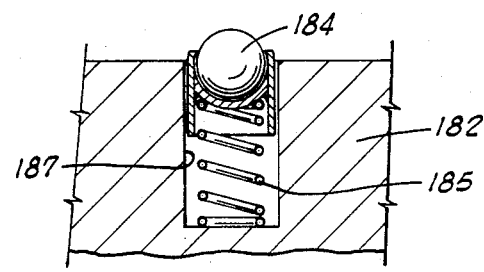

FIG. 16 is an enlarged sectional view of a spring biased roller subassembly of the sort employed in the first and second vacuum forming chambers illustrated in FIGS. 12 and 14 for assisting in the positioning of extruded plastic sheets within these chambers preparatory to vacuum forming the sheets.

Figure 17:
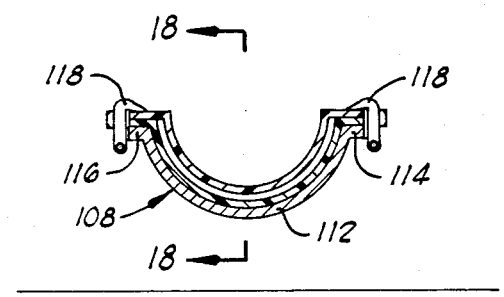

FIG. 17 is a sectional view taken along line 17—17 on FIG. 1, and illustrating a cradle element forming a part of a multi-cradle turntable subassembly forming a part of the system illustrated in FIG. 1.

Figure 18:
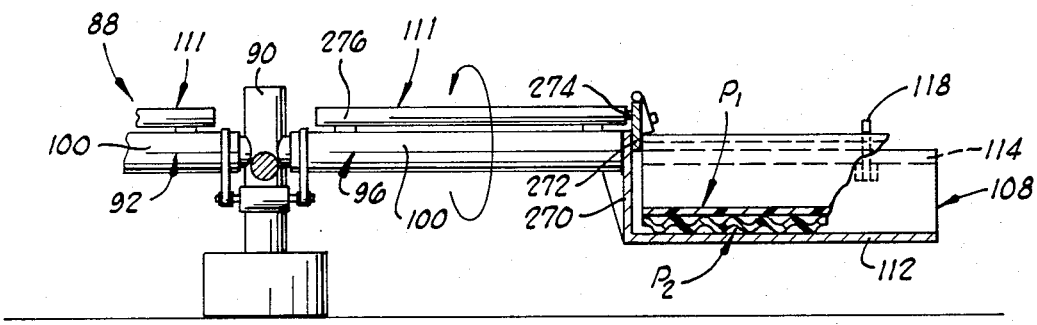

FIG. 18 is a partial sectional view taken along line 18—18 on FIG. 17.

FIG. 19 is a sectional view taken along line 19—19 on FIG. 1, and illustrating the interior of an RF bonding and assembly chamber forming a part of the system shown in FIG. 1.

FIG. 20 is a detailed sectional view illustrating a portion of the structure shown in FIG. 19 in enlarged form, and illustrating the manner in which certain RF heating elements are disposed in relation to the preformed semi-cylindrical plastic parts making up the composite, large diameter pipe being formed in the system illustrated in FIG. 1.

FIG. 21 is a sectional view taken along line 21—21 on FIG. 19.

FIG. 22 is a sectional view taken in a transverse plane extending through the center of an expandable mandril forming a part of the system illustrated in FIG. 1, and shown in longitudinal section as a part of the structure depicted in FIG. 21.

FIG. 23 is a sectional view taken along line 23—23 on FIG. 1 and illustrating, in section, a shearing subassembly employed for shearing away certain flange portions formed at the opposite outer sides of the large diameter pipe during the fabrication of the pipe.

DETAILED DESCRIPTION OF A PREFERRED EMBODIMENT OF THE INVENTION

Referring initially to FIG. 1 of the drawings, a system which is utilized to fabricate the large diameter double-walled pipe of the invention is illustrated. The system includes an extrusion die of conventional type, and designated generally by reference numeral 10. The extrusion die 10 extrudes a flat sheet 12 of synthetic resin material. The extruded sheet 12 gravitates across a plurality of supporting roller elements schematically illustrated, and designated by reference numeral 14, to a point where a shearing knife 16 or other suitable cutting apparatus is employed to shear the sheet into pre-determined lengths or panels 18.

From the shearing knife 16, the panels 18 are moved on a suitable conveyor system 20, which can be powered or gravitational in character, to a position on a supporting rack 22 which includes a plurality of parallel spaced fingers 24. From the supporting rack 22, the extruded panels 18 are sequentially picked up by an elevating and transporting mechanism denominated generally by reference numeral 26.

The elevating and transporting mechanism 26 includes a plurality of hydraulically elevatable arms 28. Each elevatable arm carries at its outer end, a fork structure 30 having tines 32 which are spaced for passage through the fingers 24 of the supporting rack 22 when the respective elevatable arm 28 is elevated. The several arms 28 are connected at their ends opposite the respective fork structures 30 to a central rotary post 34 which is connected to a suitable power source for undergoing rotation, and is timed or stepped in its rotary motion to stop at selected positions to extend the arms to the spaced work stations A-D depicted in FIG. 1.

After picking up one of the plastic panels 18 at the initial pickup station B where the panel is supported upon the supporting rack 22, the first elevating and transporting mechanism 26 carries the sheet to station B and into a heating chamber 36 which is of conventional construction similar to that illustrated and described in a paper entitled "Decorating Rigid Components" by W. P. Winton, Nov. 12, 1974 and published by Brown Machine Division of Kolhring Company. In the heating chamber 36, the plastic panel 18 is heated to a softened, formable state. While the panel 18 is still heated, the elevating and transporting mechanism 26 is again actuated and carries the softened heated sheet on the fork structure 30 to a sheet discharge work station D.

At the sheet discharge work station D, the sheet is transferred, while still in the soft heated condition, to one of the fork structures 38 of a second elevating and transporting mechanism 40 which is constructed similarly to the first elevating and transporting mechanism 26. Although, like the first elevating and transporting mechanism 26, the second elevating and transporting mechanism 40 includes a plurality of fork structures 38 carried at the ends of hydraulically elevatable arms, in the mechanism 40 only two such arms 42 are provided and extend at an angle of about 120° with respect to each other. These arms 42 are connected at their ends opposite the ends which carry their respective fork structures 38 to a central oscillating post 44 which does not undergo complete rotation, but oscillates through an angle of about 240° about a vertical axis to periodically bring the two fork structures forming a part thereof to two alternate positions. Suitable timing mechanism (not shown) is provided to arrest the oscillating movement of the oscillating post 44 to position the fork structures carried thereon in two of the three stations, D,E or F illustrated in FIG. 1.

The second elevating and transporting mechanism 40, after lifting the softened panel 18 of plastic from one of the fork structures 30 of the first elevating and transporting mechanism 26 after it has been removed from the heating chamber 36 to the discharge station D, will oscillate to cause the fork structure 38 thereof upon which the panel rests to swing about to one of two alternate discharge stations E or F. The operation of the second elevating and transporting mechanism 40 is such that it alternates in its oscillating movement so as to carry successive, alternate panels 18 of the softened plastic removed from the work station D to either the position illustrated in dashed lines in FIG. 1 (station E) or the position there illustrated in full lines (station F). A pair of trackways 46 and 48 are provided to facilitate movement of the entire mechanism 40 along a selected one of two paths for purposes hereinafter described. When a softened plastic panel 18 is carried to the position illustrated in dashed lines (station E) by the second elevating and transporting mechanism 40, the sheet is then moved off of the tines of the fork structure 38 upon which it is supported into the heated interior of a first heated vacuum forming chamber 50. For reasons which will hereinafter become apparent, those panels 18 which are placed in the first heated vacuum chamber 50 will hereinafter be described as $P_1$ panels.

In the first vacuum forming chamber 50, the panel $P_1$, initially having the rectangular configuration illustrated in FIG. 2, which configuration it has had since leaving the supporting rack 22 and the heating chamber 36, is vacuum formed to the configuration illustrated in FIG. 3 of the drawings. Concurrently, there is deposited along a pair of parallel lines 54 and 56 immediately adjacent the semi-cylindrical concavity 58 which is vacuum formed in the sheet, a paste or semi-liquid which contains dispersed therein, a plurality of ferro-magnetic particles, such as iron filings, or other material suitably conductive to function effectively in the RF fusion process used to join complementary parts of the pipe in a manner hereinafter described. As the softened plastic sheet $P_1$ is vacuum formed to the configuration illustrated in FIG. 3, the semi-cylindrical concavity 58 is formed integrally with a pair of radially outwardly extending flanges 60 and 62 which are aligned in a diametric plane of the semi-cylindrical concavity. This smooth walled part $P_1$ will become one-half of the internal liner or sleeve of a double-walled, large diameter pipe where such is to be made as the final product, or one-half of a single walled, smooth surface pipe where such is made as the final product.

After the semi-molten plastic panel $P_1$ has been deposited in the first vacuum forming chamber 50 and while it is undergoing vacuum forming therein, the second elevating and transporting mechanism 40 is picking up the following panel 18 of semi-molten plastic material from one of the fork structures 30 of the first elevating and transporting mechanism 26. The second elevating and transporting mechanism 40 is then oscillated to move the second panel 18 to a position (station F) in which the fork structure 38 is illustrated in full lines in FIG. 1. It will be noted that when this occurs, that fork structure 38 which has previously occupied station E as illustrated in dashed lines in FIG. 1, is oscillated into a position ready to pick up the next succeeding softened plastic panel 18 which has been carried from the heating chamber 36 to the work station D by another of the fork structures 30 forming a part of the first elevating and transporting mechanism 26.

The panel 18 carried by the second elevating and transporting mechanism 40 to the position where the fork structure 38 is illustrated in full lines in FIG. 1 (station F), is next loaded into a second heated vacuum forming chamber 68. The interior of this second heated vacuum forming chamber 68 is illustrated in FIG. 14, and will be hereinafter described in detail. In the second heated vacuum forming chamber 68, the semi-molten panel of plastic is vacuum formed to the configuration illustrated in FIG. 5. The panels 18 which are placed in the second heated vacuum forming chamber 68 will be hereinafter referred to as panels $P_2$ to distinguish them fom the panels $P_1$.

It will be noted in referring to FIG. 5 that the plastic panel $P_2$ vacuum formed in the chamber 568 has been deformed to provide a semi-cylindrical concave portion 70 which is corrugated over its length to provide a series of contiguous corrugations, which can typically be of sine wave configuration, having troughs and crests as best illustrated in FIGS. 5 and 8, and as hereinafter described in greater detail. Each vacuum formed panel $P_2$ as shaped in the second vacuum forming chamber 68 further includes a pair of radially outwardly extending flanges 74 and 76. In the course of vacuum forming, the panel $P_2$ has placed thereon a pair of spaced parallel axial lines 78 and 80 of paste or semi-liquid material containing ferro-magnetic particles similarly to the procedure described as characteristic of the vacuum forming which occurs in the first heated vacuum forming chamber 50.

The shapes and relative dimensions of the vacuum formed parts $P_1$ and $P_2$ which are vacuum formed in the first vacuum forming chamber 50 and in the second vacuum forming chamber 68 are such that the corrugated part from the second chamber can be superimposed upon, and in registry with, the part from the first chamber. As seen in FIG. 6, the corrugated external element $P_2$ has a transverse cross section which forms a slightly less than 180° arc. The trough portions of the corrugations in the concave semi-cylindrical portion 70 of the corrugated part $P_2$ can thus be placed in abutting contact with the smooth outer surface (the convex side) of the semi-cylindrical portion 58 of the part $P_1$ formed in the first vacuum forming chamber. Further in this connection, while in the second vacuum forming chamber 68, spray nozzles forming a part of the apparatus within the second vacuum forming chamber, and hereinafter described, function to spray the paste or semi-liquid material containing the ferro-magnetic particles on the radially inner side of each of the trough portions of the several corrugations which are formed in the plastic panel $P_2$. This effectively forms a seris of longitudinally spaced arcuate bands of paste or semi-liquid material which are severally located at the radially innermost part of the corrugations where the material is therefore positioned to contact the convex, smooth outer peripheral surface of the semi-cylindrical concavity 54 of the internal or liner element $P_1$ formed from the first softened panel of plastic in the first heated vacuum forming chamber 50.

The smooth walled inner liner $P_1$ and the corrugated outer shell $P_2$ which are formed in the first heated vacuum forming chamber 50 and in the second heated vacuum forming chamber 68, respectively, are removed from the vacuum forming chambers in any suitable fashion, and are placed upon cradle elements which are carried on a rotating cradle subassembly, designated generally by reference numeral 88.

The rotating cradle subassembly 88, illustrated in FIGS. 1, 17 and 18, includes a rotating central post 90 which is powered for rotation about a vertical axis, and which is connected to a plurality of outwardly extending horizontal cradle arms 92, 94, 96 and 98. The cradle arms 92 and 96 are connected to the rotating central post 90 for rotation of these particular cradle arms about their longitudinal axes. This rotative movement of the cradle arms 92 and 96 will permit the concave cradles 104 and 108 carried thereby to be rotated through 180° at one point in the operation of the system, and the purpose of this movement will be hereinafter explained. Each of the cradle arms 92–98 is constructed of a hollow tubular sleeve 100 which concentrically and slidingly receives a telescoped internal rod or tubular member which is secured at its outer end to the radially outer wall of one of four concave cradles 104–110. Although the construction of each of the concave cradles 104–110 will be hereinafter described in greater detail, it will suffice at this point in this general description to point out that each cradle includes a concavity which is of substantially complimentary configuration to the outer peripheral configuration of the external corrugated element $P_2$ which is formed in the second heated vacuum forming chamber 68. A piston and cylinder structure 111 is mounted on the upper side of each of the cradle arms 92-98.

The function of the rotary cradle subassembly 88 is to pick up, superimpose and then transfer the internal liner or sleeve $P_1$ shown in FIG. 3 and the external corrugated element $P_2$ shown in FIG. 5. As the concave cradle 108 carried at the outer end of the cradle arm 96 attains a position (shown in dashed lines) in alignment with the second heated vacuum forming chamber, external corrugated element $P_2$ which is vacuum formed in that chamber is discharged into, and rests upon, the concave cradle 108 in the position illustrated in FIGS. 17 and 18. Thus, the semi-cylindrical concave portion 70 of the external corrugated element abuts against, and registers with, the similarly configured concave pan 112 of the cradle 108, and the flanges 74 and 76 are superimposed over, and flatly abut, corresponding aligned, diametric flanges 114 and 116 carried on, and forming a part of, the concave cradle 108. Each of the cradles 104-110 includes a concave pan 112 and the flanges 114 and 116 identical to the described construction of the cradle 108.

After receiving the corrugated element $P_2$ from the second heated vacuum forming chamber 68, the rotating cradle subassembly 88 is actuated to move the cradle 108 at the end of the cradle arm 96 to the position in which it is illustrated in full lines in FIG. 1. In this position, the cradle 108 is aligned with the first vacuum forming chamber 50, and is able to receive from the first vacuum forming chamber, the smooth-walled internal liner element $P_1$ shown in FIG. 3. The smooth walled liner element $P_1$ is discharged from the first vacuum forming chamber 50 into the cradle 108 so that it is superimposed upon, and lies within the corrugated external element $P_2$ carried in the cradle. This superimposed arrangement is illustrated in FIGS. 17 and 18.

When the liner element $P_1$ has been superimposed upon the corrugated element $P_2$ within the cradle 108 at the outer end of the cradle arm 96, a pair of spring clips 118 are placed in position to hold the internal and external pipe elements in the superimposed relationship preparatory to rotation of the cradle arm 96 about its longitudinal axis as indicated by the rotational arrows in FIGS. 1 and 18. Prior to, or during, the next incremental rotation of the rotating cradle subassembly about the vertical axis of the rotating central post 90, the cradle arm 96 is caused to commence to undergo rotation, and its rotation occurs through 180° to cause an inversion of the registered internal liner $P_1$ and external corrugated element $P_2$ from the position illustrated in FIGS. 17 and 18. The concavity of the internal liner $P_1$ is then facing downwardly.

Prior to the time that the cradle element 108 is caused to undergo rotation in this manner by rotation of the cradle arm 96, however, a superimposed pair of the liner element $P_1$ and the corrugated external element $P_2$ have been horizontally swung on the cradle 110, carried at the outer end of the cradle arm 98, into the position illustrated in FIG. 1. The superimposed liner element $P_1$ and external corrugated element $P_2$ remain in their initial position in which the concavity of inner liner faces upwardly similar to that position shown in FIG. 17. When the cradle element 110 at the end of the cradle arm 98 is positioned as shown in FIG. 1, the piston rod of the piston and cylinder structure 111 carried on the arm 98 is extended to push the registered pipe elements $P_1$ and $P_2$ off of the cradle 110 into an RF bonding and assembly chamber 120. The RF bonding and assembly chamber 120 is utilized for joining two sets of the liner elements and external corrugated elements to each other to form a cylindrical double-walled pipe. The details of construction of the RF bonding and assembly chamber 120 are illustrated in FIGS. 19-21 and will be hereinafter described.

The superimposed pair of the internal liner element $P_1$ and the external corrugated element $P_2$ which is moved from the cradle 110 at the end of the cradle arm 98 into the RF bonding and assembly chamber 120 is positioned in this chamber so that the concavity of the internal liner $P_1$ faces upwardly. In other words, no axial rotation of the cradle 110 at the end of the cradle arm 98 occurs, and the internal liner element and external corrugated element which are received in the chamber 120 from the cradle 110 in this case form the bottom half of the finally assembled large diameter, double-walled pipe.

After the internal liner element and external corrugated element from the cradle 110 have been positioned within the RF bonding and assembly chamber 120 in the bottom of the chamber with the concavity facing upwardly, the rotating cradle subassembly 88 is again indexed to cause rotation about the vertical axis of the rotating central post 90. This ultimately brings the cradle 108 at the end of the rotatable cradle arm 96 into alignment with the RF bonding and assembly chamber 120. As previously pointed out, however, prior to the time that the cradle 108 at the end of the cradle arm 96 has reached such position of alignment with the RF bonding and assembly chamber 120, the arm 96 has been rotated about its longitudinal axis through 180° to invert the superimposed external corrugated element and internal liner. These elements can now be pushed out of the cradle 108 into the upper position within the RF bonding and assembly chamber 120 by means of the piston and cylinder arrangement 111 carried on the cradle arm 96. When the liner and external corrugated element carried on the cradle 108 at the end of the arm 96 have been pushed into the RF bonding and assembly chamber 120 so as to be superimposed over, and complementarily mated with, the underlying pair of internal liner and external corrugated elements previously placed therein, the relative arrangement of the several plastic elements which have been previously vacuum formed, and then superimposed in the manner described, is that which is illustrated in FIGS. 6 and 7 of the drawings, and which is shown in the cross-sectional views of FIGS. 8, 19 and 21.

The details of construction of the RF bonding and assembly chamber 120 will be hereinafter described in greater detail. At this point in the general description of the system shown in FIG. 1, however, it will suffice to point out that within the chamber 120, a combination of stationary and movable die elements are provided in the chamber which can be brought to bear against the internal and external surfaces of the internal liner and external corrugated element pairs assembled in the manner shown in FIGS. 6 and 7. While in such contact, RF heating elements in the die elements direct electromagnetic radiation through the mated vacuum formed plastic elements to effect strong bonding of the elements to each other. To facilitate this, the RF coils are selectively positioned at locations to direct radio frequency electromagnetic energy through the registered internal liner elements and external corrugated elements at those locations where the lines of paste or semi-liquid material containing ferro-magnetic particles have previously been deposited. This is, of course, along lines located where the radially extending flanges which are provided on the smooth internal liner $P_1$ join or abut the corresponding radially extending flanges forming a part of the external corrugated element $P_2$ formed in the second heated vacuum forming chamber 68.

Electromagnetic waves are also directed through the assembled plastic elements $P_1$ and $P_2$ at the location where the troughs or radially innermost portions of the corrugations of the external corrugated element $P_2$ are in contact with the concave external surface of the concave semi-cylindrical portion 58 of the internal liner element $P_1$. It will be recalled that at these locations also, lines of paste or semi-liquid containing the ferro-magnetic particles have previously been deposited on these trough portions of the corrugations while the external corrugated element was being vacuum formed in the second vacuum forming chamber 68.

The effect of direction of the electromagnetic energy from the several RF coils carried within the fixed and movable dies within the RF bonding and assembly chamber 120 through the locations described in the several complimentarily nested or registered liner elements $P_1$ and external elements $P_2$ is to bond these elements together at these locations by fusing. The mechanism of such bonding is well understood in the art and the details of fusion of plastic materials along such lines where the paste has been previously deposited to establish a firm and tenacious bond at these locations is also fully described in the prior art.

A portion of the movable die mechanism which is positioned within the RF bonding and assembly chamber 120 at the time of the RF bonding operation described is an expandable internal mandrel subassembly carried on the end of an extensible piston rod 124, and hereinafter described in greater detail. The extensible piston rod 124 is retractable within a cylinder arm 126 which has one end secured to a rotatable post 128 forming a part of a rotatable pipe extractor subassembly 130.

The rotatable post 128 of the rotatable pipe extractor subassembly 130, in addition to being rotatable about its vertical axis, is also hydraulically elevatable to a small degree so that the extensible piston rod or arm 124, and the expandable internal mandrel subassembly carried on one end thereof, can be very slightly elevated. This slight elevation of the expandable internal mandrel is carried out at a time after the pipe halves have been bonded to each other by RF energy in the bonding and assembly chamber 120, and the thus joined pipe halves are to be removed from this chamber for transfer to the next point in the process.

After shifting the expandable internal mandrel slightly upwardly in the manner described by incremental upward movement of the rotatable post 128, the rotatable post is then caused to undergo rotation about its vertical axis so as to move the cylinder arm 126, extensible piston rod 124 and the expandable mandrel subassembly carried on one end thereof from the position illustrated in full lines in FIG. 1 to the position illustrated in dashed lines in that Figure. When the cylinder arm 126, the extensible piston rod 124 and expandable mandrel subassembly have reached the dashed line position, the extensible piston rod is once again extended from the cylinder arm 126 so that the mandrel subassembly and the compound or double-walled pipe carried thereon at this time is extended into a trimmer chamber designated generally by reference numeral 132.

The expandable mandrel subassembly is then retracted to its non-expanded position, and is axially reciprocated by retraction of the extensible piston rod 124 into the cylinder arm 126. The status of the expandable mandrel subassembly, extensible piston rod 124 and cylinder arm 126 is thus returned to that represented by the dashed line position shown in FIG. 1 after the double-walled pipe has been deposited in the trimmer chamber 132.

Within the trimmer chamber 132, the pipe is subjected to a shearing action which shears away the overlapped or superimposed flanges 60, 76 and 62, 74 of the pipe sections $P_1$ and $P_2$. The details of construction of the trimmer chamber 132 are hereinafter described.

When the shearing operation has been completed, a double-walled pipe has been formed having a smooth walled internal liner and an external corrugated element firmly bonded to each other at the troughs of the corrugations, and also adjacent the lines of joinder of the pipe halves in a diametric plane of the pipe where the flanges previously provided on each of the superimposed elements have been sheared away. The pipe is thus completed, and can be discharged in any suitable fashion from the trimmer chamber 132 and onto a conveyor 138 for conveyance to a point of ultimate disposition.

DETAILED DESCRIPTION OF THE STRUCTURAL SUBASSEMBLIES USED IN THE INVENTION

The first elevating and transporting mechanism 26 which is utilized for lifting plastic panels 18 from the supporting rack 22, and moving the panels into the heating chamber 36 includes, as previously indicated, a plurality of elevatable arms 28. Each arm 28 carries a fork structure 30 which includes a plurality of substantially parallel spaced tines 32. The spacing of the tines 32 is such that they can pass through the fingers 4 of the supporting rack 22 to lift one of the panels 18 placed there after extrusion from the die 10 and severance by the shearing knife 16. Each of the elevatable arms 28 is raised and lowered between the full line and dashed line positions shown in FIG. 10 by means of a hydraulic piston and cylinder assembly 150.

Each hydraulic piston and cylinder subassembly 150 includes a cylinder 151 pivotally connected to a clevis bracket 152 secured to the lower end portion of the vertically extending post 34. Each post 34 is supported in a suitable mechanism 156 (FIG. 10) which permits the post to be driven in rotation about its vertically axis, and to be indexed in such movement to stop at one of the several stations A–D illustrated in FIG. 1 of the drawings. Thus, after picking up a plastic panel 18 from the supporting rack 22, the first elevating and transporting mechanism 26 is rotated clockwise so that the panel is carried through 90° into the heating chamber 36. After the panel 18 is heated in the chamber 36 (station C), it is moved to station D where the rotation of post 34 is temporarily arrested. While at station D, the panel 18 carried on the tines 32 of fork structure 30 can be lifted up on the tines 156 of one of the fork structures 38 carried on, and forming a part of, the second elevating and transporting mechanism 40.

During the time one of the fork structures 30 moves from the position identified as station D in FIG. 1 to the position identified as station B (at which the panel is to be picked up or lifted from the supporting rack 22), the piston rod of the respective associated hydraulic piston and cylinder assembly 150 is retracted to lower the respective fork structure 30 to the dashed line position shown in FIG. 10. As shown, this retractive movement occurs concurrently with the rotation of the post 34 through two further 90° increments to return the fork structure from the D station to the B station illustrated in FIG. 1.

The second elevating and transporting mechanism 40 is constructed similarly to the first elevating and transporting mechanism 26, except that the second mechanism is provided with only two hydraulically elevatable arms 42 rather than four such arms as in the case of the first elevating and transporting mechanism. Thus, the second elevating and transporting mechanism 40 includes the centrally located, rotatable post 44 which is connected to drive mechanism 163 which drives and indexes the post in a stepped oscillating movement between the stations identified as stations D, E and F in FIG. 1.

When the fork structure 38 carried on one of the elevatable arms 42 forming a part of the second elevating and transporting mechanism 40 is oriented to position a softened panel $P_2$ of plastic at station F, the transporting mechanism 40 can then be further actuated to move, in its entirety, along a track 46 which extends parallel to the central longitudinal axis through the second vacuum forming chamber 68. In similar fashion, at a time when a fork structure 38 of the second elevating and transporting mechanism 40 is in the dashed line position portrayed at station E, the entire second elevating and transporting mechanism can be caused to move along a second trackway 48 which extends parallel to the longitudinal central axis of the first vacuum forming chamber 50.

These respective movements permit the cantilevered, unobstructed ends of the hydraulically elevatable supporting arms 42 to project through open sides of the first and second vacuum forming chambers 50 and 68, respectively, as such open sides are illustrated in FIGS. 12 and 14 of the drawings. These movements further function to bring softened panels $P_1$ and $P_2$ into the interior of the respective first and second vacuum forming chambers 50 and 68 and into a position between an upper movable die and a lower fixed die, all as hereinafter explained. Once the plastic panels $P_1$ and $P_2$ have been so positioned, they can be pushed off of the fork structures 38 carried on the arms 42 of the second elevating and transporting mechanism 40 by any suitable means, such as by a push rod manually manipulated by an operator, or by a hydraulic piston and cylinder arrangement supported on the upper side of the respective hydraulically elevatable arm similar to the manner in which the hydraulical piston and cylinder subassemblies 111 are supported upon the each of the cradle arms 92–96 forming a part of the rotating cradle subassembly 88 as hereinafter described in greater detail.

The first vacuum forming chamber 50, is illustrated in cross-sectional detail in FIGS. 12 and 13. The chamber 50 includes housing 160 which is completely enclosed except for slotted openings at each end an opening 162 along one side, as shown in FIG. 12. A movable male die or vacuum assist structure 164 is reciprocably mounted within the housing 160, and is caused to undergo reciprocation by piston and cylinder subassemblies 166 mounted atop the housing. Each piston and cylinder subassembly 166 has a piston rod 168 projecting through the housing and connected at its inner end to the male die 164.

As shown in FIG. 12, the male die 164 is a generally T-shaped member having a pair of aligned lateral flanges 169 and a protuberant, convex die element 171 between flanges. The flanges 169 of the male die 164 are grooved or slotted longitudinally by a pair of parallel slots 172 and 173. The slots 172 and 173 protectively contain a series of recessed nozzles or jets 174 which are connected to a suitable source (not shown) of paste or semi-liquid containing dispersed therein, a plurality of ferro-magnetic particles as hereinbefore explained. The use of such semi-liquid dispersion in carrying out the electromagnetic bonding of plastic parts to each other is explained in greater detail in U.S. Pat. No. 3,391,846.

In the lower portion of the first vacuum forming chamber 50, a supporting block 175 is provided, and defines a central concavity 176. Fitted within the central concavity 176 is a stationary female die element 178. The female die element 178 includes a pair of parallel, opposed aligned flanges 180 and 182. The flanges 180 and 182 each have a plurality of bearing rollers 184 retractably mounted for rotation in the upper surface thereof. Each of the rollers 184 is resiliently biased by a spring 185 to a position in which it protrudes from a mounting recess 187 as shown in FIG. 16.

The female die element 178 further includes a concave portion 186 which has a plurality of radial vacuum orifices 188 formed therethrough. A vacuum line 190 is connected between the concavity 176 in the block 175 and a vacuum source 192. A plurality of radiant heating elements 194 and 196, as well as a pair of conduction heaters 200 and 202 located in the block 175, are provided for purposes of heating the interior of the first vacuum forming chamber 50 and maintaining the plastic panel $P_1$ in a very soft condition after it has been placed in this vacuum forming chamber.

In FIG. 12, a semi-molten extruded panel $P_1$ which has been heated in the heating chamber 36 is shown positioned within the first vacuum forming chamber 50. After the panel $P_1$ has been so positioned, the male die element or vacuum assist element 164 is reciprocated downwardly by actuation of the piston and cylinder subassemblies 166 so that the convex protuberant portion 171 of the male die presses down against the upper side of the panel, and causes it to move down into the concave portion 186 of the female die 178. Concurrently, vacuum is applied through the vacuum orifices 188.

At this time, the bearing rollers 184, by reason of their mode of mounting upon springs 185 as shown in FIG. 16, are depressed beneath the upwardly facing surface of the flanges 180 and 182 so that outer edge portions of the semi-molten plastic panel $P_1$ lie flatly against the flanges 180 and 182, and seal the vacuum being applied to the central portion of the panel. If desired, the flanges 180 and 182 may be made to carry upwardly facing elastomeric strips (not shown) to enhance this sealing action.

Thus, by means of the vacuum assist, constituted by the protuberant portion 171 of the male die 164, and the vacuum applied from the vacuum source 192, the semi-molten panel $P_1$ is deformed into the shape illustrated in FIG. 3 of the drawings. Just prior to the time that the panel $P_1$ attains this shape, however, and at a time when the lateral flanges 169 of the male die 164 contact the upper surface of the panel, liquid or semi-fluid paste material carrying ferro-magnetic particles is ejected from the nozzles 174 so as to spray the dispersion containing ferro-magnetic particles along the lines 54 and 56 illustrated in FIG. 3. When this operation has been completed, the male die 164 is retracted. The housing 160 is then opened at one end to permit the internal liner element P₁, as thus formed in the first vacuum forming chamber 50, to be discharged into one of the concave cradles 104–110 forming a part of the rotary cradle subassembly 88. Such cradle will have already received one of the external corrugated elements P₂ formed in the second vacuum forming chamber 68, as hereinbefore mentioned and hereinafter explained in greater detail.

As has previously been explained, from station F, one of the softened plastic panels P₂ carried on one of the fork structures 38 of the second elevating and transporting mechanism 40 is moved into the second vacuum forming chamber 68. The interior of the second vacuum forming chamber 68 is illustrated in detail in FIGS. 14 and 15. The interior of the second vacuum forming chamber 68 is to some extent similar to the interior of the first vacuum forming chamber 50. Thus, a housing 204, which is quite similar to the housing 160 previously described, also characterizes the second vacuum forming chamber 68. It is provided with a longitudinally extending slot 206 along one side thereof, and is open at its opposite ends as shown in FIG. 15, to accommodate panel loading movement of one of the elevatable arms 42 of the second elevating and transporting mechanism 40. A support block 208 defining a central concavity 209 is provided in the bottom portion of the second vacuum forming chamber, and a male die or vacuum assist element 210 is reciprocably mounted in the upper portion of the chamber. The male die element 210 is reciprocated by means of synchronized piston and cylinder subassemblies 212.

The second heated vacuum forming chamber 68 further includes a female die element 214 which is positioned in the lower portion of the chamber, and includes a pair of opposed flanges 216 and 218 by which it is supported upon block 208. The flanges 216 and 218 of the female die element 214 carry spring biased bearing rollers 220 identical to the bearing rollers 184 previously described in referring to the first vacuum forming chamber 50, and illustrated in detail in FIG. 16 of the drawings. The vacuum forming chamber 68 further includes a pair of radiant heating elements 222 and 224, and a pair of heating elements 226 and 228 embedded in the block 208 and heating the block by conduction.

Since a corrugated external element P₂ of the compound pipe structure is to be vacuum formed in the second vacuum forming chamber 68, the male die element 210 and the female die element 214 are constructed to accomplish corrugation of the panel P₂. They therefore differ in their configuration from the male die element 164 and female die element 178 utilized in the first vacuum forming chamber 50. Thus, the male die element 210 which is provided in the second vacuum forming chamber 68 includes a pair of aligned horizontal flanges 230 and 232 which are recessed or grooved, as shown at 234 and 236, to accommodate lines of nozzles or jets 238 and 240 in the manner hereinbefore described. The male die 210 further includes a protuberant convex central portion 242 which is transversely corrugated over its length from one end of the housing 204 to the other so as to provide a series of downwardly projecting protuberant, arcuate or convex tongues 246 which are separated by spaces 248 as shown in FIG. 15. Within each of the spaces 248 between the convex tongues 246 are disposed a plurality of jets or nozzles 250 for spraying paste or a semi-liquid containing ferro-magnetic particles in the manner hereinfore described.

The female die 214 includes extending flanges a concave central portion, designated generally by reference numeral 252. The concave central portion 252 is spaced slightly upwardly from the concavity 209 formed in the block 208. The concave central portion 252 of the female die 214 has a sinuous or sine wave-shaped corrugated upwardly facing surface, as shown in FIG. 15, so that it presents upwardly facing ridges 256 of the sort shown in FIGS. 14 and 15. Between ridges 256 are a plurality of troughs 258, each of which is vertically aligned with one of the downwardly depending convex tongues 246 carried on the male die 210. Thus, the tongues 246 will register with the troughs 258 at a time when the male die is reciprocated downwardly during formation of the external corrugated element P₂ of the pipe in the second heated vacuum forming chamber 68.

When the male die 210 is reciprocated downwardly by extension of the piston rods forming portions of the piston and cylinder subassemblies 212, the semi-molten plastic panel P₂ positioned in the second vacuum forming chamber 68, as shown in FIGS. 14 and 15, is deformed downwardly by contact with the male die. Concurrently, vacuum is applied from a source of vacuum 260 through a vacuum passageway 262 in the block 208. The vacuum acts through a plurality of vaccum orifices 264 in the female die 214. The vacuum orifices open into the troughs 258 in the corrugations formed on the upwardly facing surface of the female die 214. The result is the formation from the flat panel P₂ of a corrugated element of the configuration illustrated in FIG. 5 of the drawings. In the course of forming the plastic panel P₂ to this configuration, lines of ferro-magnetic material contained in a liquid or semi-liquid substrate are formed along the panel P₂ adjacent its flanges, as indicated by the reference numerals 78 and 80 in FIG. 5. This material is placed at this location by timed ejection of the dispersion from the jets 238 and 240 disposed in the recesses or grooves 234 and 236 in the flanges 230 and 232 of the male die 210. Concurrently, lines of the ferro-magnetic particle-containing paste or semi-liquid are deposited by the jets or nozzles 250, arrayed in the semi-circular configurations shown in dashed lines in FIG. 14 upon the radially innermost portions (troughs) of the corrugations formed in the corrugated element P₂ of FIG. 5.

After the plastic panel P₂ has been vacuum formed to the semi-cylindrical corrugated configuration shown in FIG. 5, the male die 210 is retracted by retraction of the piston rods of the piston and cylinder subassemblies 212. In the course of this retraction, the roller bearings 220, previously depressed, are also extended by the associated springs, and the external corrugated element becomes rollingly supported upon these rollers carried in the flanges 216 and 218 of the female die 214. From this position, the formed corrugated external element P₂ can be rolled or pushed out of the second vacuum forming chamber 68 onto one of the cradles of the rotating cradle subassembly 88. As previously explained, the direction of rotation of the rotating cradle subassembly 88 is such that the external corrugated element P₂ formed in the second vacuum forming chamber 68 will be placed in one of the cradles 104–110 prior to the time that this same cradle is swung to the full line position in which the cradle 108 is illustrated in FIG. 1. In the latter position, the smooth-walled internal liner $P_1$ is placed in this cradle on top of the corrugated external element $P_2$ which has been previously placed in the cradle.

The cradles 104–110 employed in the rotating cradle subassembly 88 are of two general types. One type (cradles 104 and 108) is caused to undergo rotation through 180° about the axis of its respective supporting cradle arm, and the other is of the type which does not rotate about the axis of its supporting cradle arm during the entire course of one revolution of the rotating cradle subassembly 88. The structural difference between the two types of cradles is only in the provision, in the type which is rotated, of spring retention elements 118 for holding the smooth-walled inner liner element $P_1$ and the corrugated external element $P_2$ in superimposed relation to each other, and in their relative positions within this type of cradle at the time this type of cradle is rotated through 180°. The cradles 104 and 108 are the rotating cradles described. Cradles 106 and 110 do not undergo such rotation about the longitudinal axes of their respective supporting arms 94 and 98.

In other structural respects, each of the cradles 104–110 includes the concave central portion 112, and the two flanges 114 and 116 aligned along a diameter of the cradle as illustrated in FIG. 17.

When the corrugated external element $P_2$ and the smooth-walled internal liner $P_1$ are positioned in superimposed registry in a cradle of either of the types described, their relationship to the cradle is that which is illustrated in cross-section in FIGS. 17 and 18. As there shown, each of the cradles 104–110, in addition to the concave portion 112 and the flanges 114 and 116 includes a radially inner transverse vertical wall 270 which extends normal to the longitudinal axis of each cradle, and to the longitudinally axes of the registered inner liner $P_1$ and external corrugated element $P_2$. Such inner wall 270 is secured to the radially outer end of the respective cradle arm 92–96.

Positioned just inside each cradle adjacent the radially inner wall 270 is a spacer-pusher plate 272. The spacer-pusher plate 272 is secured to the outer end of a piston rod 274 which is reciprocably mounted in the cylinder 276 of the respective piston and cylinder subassembly 111 which is mounted to the upper side of each of the cradle arm 92–96 as shown in FIGS. 1 and 18. Each spacer-pusher plate 272 is dimensioned to extend across the cradle and to abut the aligned upper portions of the smooth-walled internal liner $P_1$ and external corrugated element $P_2$.

When the rotating cradle subassembly 88 is rotated to a position such that the cradle 110 is aligned with the RF bonding and assembly chamber 120, the piston and cylinder subassembly 111 supported on the cradle arm 98 is actuated to extend the piston rod 274 thereof and to move the spacer-pusher plate 272 outwardly along the cradle 110. This movement pushes the superimposed inner liner $P_1$ and the corrugated external element $P_2$ out of the cradle 110 into the RF bonding and assembly chamber 120. As the smooth inner liner $P_1$ and the corrugated external element $P_2$ from the cradle 110 are pushed into the RF bonding and assembly chamber 120, the flanges 74 and 76 of the corrugated external element bear against, and roll longitudinally upon, a plurality of spring biased bearing spheres or balls 278 which are carried in the horizontally aligned oppositely disposed flanges 280 and 282 of a lower RF heating sleeve designated generally by reference numeral 286.

The lower RF heating sleeve 286 further includes, as best illustrated in FIG. 21, a plurality of contiguous corrugations 290 located on the upwardly facing surface of a concave central portion 288 of the lower heating sleeve. The sleeve 286 further carries a plurality of embedded RF coils or heating elements 292 which are aligned with the crests of the corrugations 290 carried on the interior of the concave portion 288. Also embedded in the lower heating sleeve 286 are two parallel lines of side seaming RF heating elements or coils 296 and 298 which are disposed to direct radio frequency electromagnetic waves along the lines at which the flanges 74 and 76 carried by the outer corrugated plastic element $P_2$, itself carried in the bottom of the RF bonding and assembly chamber, intersect the concave portion of this corrugated element. This orientation is best illustrated in FIG. 20 of the drawings.

The lower RF heating sleeve 286 is supported in the lower portion of a housing 300. The housing 300 has an open slot 302 along one side thereof, and has openings 304 and 306 at its opposite ends as illustrated in FIG. 21. An upper RF heating sleeve, designated generally by reference numeral 310, is reciprocably mounted for reciprocating vertical movement in the upper portion of the housing 300. The upper RF heating sleeve 310 has a centrally disposed, longitudinally extending downwardly facing concavity 312 formed therein, and the downwardly facing surface of this concavity carries a plurality of contiguous corrugations 314 formed by adjacent troughs and crests, as best shown in FIG. 21. In alignment with the crests of the corrugations which thus characterize the downwardly facing surface of the concavity 312 in the upper RF heating sleeve 310 are a plurality of groups of circumferentially arrayed RF heating elements or coils 320. There are also, in correspondence to the arrangement of similarly functioning heating elements 296 and 298 in the lower RF heating sleeve 286, a pair of parallel lines of side seaming RF heating elements or coils 322 and 324 positioned at the locations illustrated in FIGS. 19 and 20. They are thus shown to be adjacent the superimposed, radially extending flanges 60, 62 and 74, 76 of the superimposed inner and outer pipe elements $P_1$ and $P_2$. The upper RF heating sleeve 310 is caused to undergo vertical reciprocation within the housing 300 by means of a plurality of piston and cylinder assemblies 328. When the piston rods 329 of these assemblies are extended in synchronism, the upper RF heating sleeve 310 is caused to move downwardly to the position illustrated in FIGS. 19 and 21.

An expandable mandrel subassembly, designated generally by reference numeral 330, is extendible into the housing 300 of the RF bonding and assembly chamber 120 to a position between the upper RF heating sleeve 310 and the lower RF heating sleeve, as illustrated in FIGS. 19 and 21. The expandable mandrel subassembly 330 includes a plurality of frusto-cylindrical segments or quadrants 332, 334, 336 and 338 as shown in FIGS. 21 and 22. The quadrants 332–338 of the expandable mandrel subassembly 330 are movably interconnected by a plurality of expansion spring elements 340, 342, 344 and 346 as illustrated in FIG. 22. The spring elements 340–346 continuously urge the quadrants 332–338 into a contiguous contracted position in which radial faces of the quadrants abut each other, as shown in full lines in FIG. 22.

Disposed centrally within the quadrants 332–338 in a bore 350 located at the center thereof is a multiple wing expander element, designated generally by reference numeral 352. The multiple wing expander element 352 includes a central hub 354 which is keyed to a shaft 356 which extends axially therethrough as shown in FIGS. 21 and 22. The multiple wing expander element 352 further includes two axially spaced sets of radially extending quadrant wings spaced along the hub 354 as shown in FIGS. 21 and 22. Each set includes four quadrant wings 360, 362, 364 and 366 spaced at 90° from each other around the hub 356. Each of the wings 360–366 has a beveled or tapered radially outer surface which is adopted to function as a cam surface in cooperation with one of a series of aligned, beveled or tapered surfaces formed on the radially inner sides of each of the several frusto-cylindrical quadrants 332–338 as illustrated in FIGS. 21 and 22.

The shaft 356 and the central hub 354 which is keyed thereto are reciprocably mounted as an extensible and retractable piston within a cylinder 370. The cylinder 370 is itself mounted within, and movable with, an external sleeve constituted by the extensible piston rod 124 previously described. The extensible piston rod 124 carries a flange 372 at one end thereof which is secured to an annular plate 374. The annular plate abuts the aligned ends of the frusto-cylindrical quadrants 332–338 of the expandable mandrel subassembly 330. The annular plate 374 also is of sufficient diametric size that the peripheral edge of the annular plate abuts the end of the lower RF heating sleeve 286 as illustrated in FIG. 21. At the end of the shaft 356 opposite its end which projects into the cylinder 370 within the hub 354, the shaft is attached to an end plate 378 which is positioned to bear against the aligned end faces of the frusto-cylindrical quadrants 332–338, as shown in FIG. 21, when the shaft 356 is retracted.

The extensible piston rod 124 is extendable from, and retractable within, a cylinder arm 126 adopted to receive hydraulic power fluid for the purpose of extending or retracting the extensible piston rod. The cylinder arm 126 is secured to a rotatable post 128 forming a part of the rotatable pipe extractor subassembly 130 previously described.

As illustrated in FIG. 1, the rotatable pipe extractor subassembly 130 can be operated to cause the rotatable post 128 to undergo rotation about its vertical axis, thus swinging the cylinder arm 126 and the extensible piston rod 124 between the full line position illustrated in FIG. 1 and the dashed line position shown therein. When in the full line position illustrated in FIG. 1, the extensible piston rod 124 can be extended so as to position the expandable mandrel subassembly 330 within the central portion of the RF bonding and assembly chamber 120 at a location between, and spaced from, the lower RF heating sleeve 214 and the upper RF heating sleeve 210. When the hub 354 and its associated shaft 356 are then extended from the cylinder 370, the effect is to cam the four quadrants 332–338 of the expandable mandrel subassembly 330 radially outwardly from the full line position shown in FIG. 22, to the dashed line position, also illustrated therein. The expanded position of the expandable mandrel quadrants is also illustrated in FIGS. 19 and 21.

In order to permit the partially finished double-walled pipe structure to be extracted or removed from the RF bonding and assembly chamber 120, the rotatable post 128 is elevatable, as the piston rod element of a piston and cylinder subassembly, and the base cylinder in which it is slidably mounted is indicated by reference numeral 380 is FIG. 21. Vertical extension or retraction of the rotatable post 128 thus causes an elevation and a lowering, respectively, of the cylinder arm 126, the extensible piston rod or arm 124 and the expandable mandrel subassembly 330 carried on the end of the extensible piston rod 124.

Prior to loading the superimposed pipe halves, each consisting of a smooth-walled inner liner $P_1$ and a corrugated external element $P_2$, into RF bonding and assembly chamber 120, the post 128 is elevated, and the expandable mandrel subassembly 330 is contracted to its full line position illustrated in FIG. 22. In this orientation of these parts of the rotatable pipe extractor subassembly 130, a space is provided beneath the abutting quadrants 332–338 of the expandable mandrel subassembly, and between these quadrants and the lower RF heating sleeve 286. Into this space a superimposed and registered smooth-walled inner liner $P_1$ and corrugated external element $P_2$ can be pushed from the cradle 110 in the manner hereinbefore described. The superimposed pipe elements $P_1$ and $P_2$ will continue to move on the rollers 278 carried in the flanges 280 and 282 of the lower RF heating sleeve 286 until these registered pipe elements are stopped by contact with the annular plate 374 of the rotatable pipe extractor subassembly 130. When their movement is so arrested, the corrugations of the corrugated external pipe element $P_2$ are in alignment with the corrugations 290 formed on the upwardly facing, internal surface of the concave portion 288 of the lower RF heating sleeve 286.

After the bottom half of the pipe, constituted by one of the semi-cylindrical smooth-walled elements $P_1$ and one of the corrugated external elements $P_2$ in registry therewith, has been positioned over the lower RF heating sleeve 286 in the manner described, the rotatable post 128 is retracted within the cylinder 380 to lower the cylinder arm 126, extensible piston rod 124, and the expandable mandrel subassembly 330 carried on the end thereof. During this time, the expandable mandrel subassembly 330 is still in the contracted, retracted full line position shown in FIG. 22. The lowering of the post 128, cylinder arm 126, piston rod 124 and expandable mandrel subassembly 330, slightly enlarges the space which exists between the outer peripheral surface of the several mandrel quadrants 332, 336 and 338 and the portion of the housing 330 which defines the upper side of the opening 306 in the side of the housing which faces each feeding cradle when aligned with RF bonding and assembly chamber 120.

This status of the expandable mandrel subassembly 330 in a retracted status of the post 128 thus facilitates the pushing of the upper pipe half, constituted by superimposed and registered internal smooth-walled liner $P_1$ and external corrugated element $P_2$, carried in the rotated cradle 108, into the upper portion of the RF bonding and assembly chamber 120. The lateral flanges 60 and 62 of the lower superimposed pipe element $P_1$ will slide upon the upwardly facing flanges 60 and 62 of the superimposed elements forming the lower half of the pipe. The smooth-walled inner liner $P_1$ and external corrugated element $P_2$ of the upper half of the pipe can slide along the lower half by contact of the corresponding flanges until, as previously described, the registered elements of the upper half of the pipe are stopped by contact with the annular plate 374 secured to the flange 372 at one end of the extensible piston rod 124.

With the two semi-cylindrical halves of the double-walled pipe in this position, the upper RF heating sleeve 310 is lowered by means of the piston and cylinder subassemblies 328 until the corrugations 314 on the downwardly facing surface of the concave portion 312 thereof are in registering contact with the corrugations formed in the corrugated external element $P_2$ of the upper portion of the double-walled pipe. The pipe is now securely clamped between the upper RF heating sleeve 310 and the lower RF heating sleeve 286.

At this time, the piston rod constituted by the hub 354 and the shaft 356 are extended from the cylinder 370. This causes the quadrant wings 360-366 in each of the two sets of quadrant wings to cam against the mating inclined or beveled surfaces formed on the radially inner sides of the frusto-cylindrical quadrants 332-338. These quadrants are moved by such camming action against the contracting bias of the interconnecting springs 340-346 to the dashed line, expanded position illustrated in FIG. 22, and also shown in FIGS. 19 and 21. In this position, the quadrants bear against the concave inner surfaces of the smooth-walled inner liner elements $P_1$ of the upper and lower halves of the double-wall pipe.

The expandable mandrel subassembly 330 has been thus actuated to a position in which the frusto-cylindrical quadrants 332-338 thereof are expanded and bear against the inner surfaces of the two opposed, smooth-walled inner liner elements $P_1$. The upper and lower RF heating sleeves 310 and 286, respectively, are in mating contact with the corrugated outer elements of the pipe. The several RF heating elements or coils previously described are then energized. Thus, the RF heating elements 292 and 320 which are disposed in the lower RF heating sleeve 286 and the upper RF heating sleeve 310, respectively, are energized, as are aligned RF heating elements 339 located in the several frusto-cylindrical quadrants 332-338 of the expandible mandrel subassembly 330. The latter RF heating elements are disposed directly opposite the heating elements 292 and 320 so that RF radio frequency electromagnetic waves are directed through the circular lines of contact of the trough radially inner portions of the corrugations of the external corrugated element $P_2$ with the outer peripheries of the smooth-walled inner liner elements $P_1$ (as schematically illustrated in FIG. 8). It will be recalled that it is along these circular lines of contact that the semi-liquid or paste containing the ferro-magnetic particles has been previously desposited. As a result of the RF heating thus developed, a strong fusion bond is developed along the circumferential lines of contact of each of the troughs of the corrugations formed on the external elements with the smooth external walls of the internal liner elements.

Concurrently with the bonding of the corrugation troughs of the corrugated external elements $P_2$ to the smooth external walls of the smooth-walled internal liners $P_1$, side seaming heating elements disposed in the lines 296, 298 and 321, 322 in the lower heating sleeve 286 and the upper heating sleeve 310, respectively, are energized. So also are the side seaming RF heating elements 341 and 343 disposed in axial lines near the outer peripheral surfaces of the frusto-cylindrical quadrants 332 and 336, respectively, as illustrated in FIGS. 19, 20 and 22. The result of the transmission of RF electromagnetic waves through the superimposed pipe elements at this location is to strongly bond the upper semi-cylindrical half of the pipe to the lower semi-cylindrical half along parallel axial lines at which the registered and superimposed flanges 60-62 and 74-76 of the several pipe elements are joined to the semi-cylindrical portions of the several pipe elements as illustrated in FIG. 20. The liquid containing ferro-magnetic particles has previously been deposited along these lines.

The way in which thermoplastic fusion, accomplished by the use of RF heating, is carried out, and the bonding effects achieved, are well understood in the art. The plastic material of the pipe elements $P_1$ and $P_2$ is fused at the location where the ferro-magnetic particles are impinged by the radio frequency electromagnetic radiation due to the heat generated at this location. The result is a strong fusion bonding which occurs at these locations. The smooth-walled inner sleeves of the two pipe halves are firmly bonded to the external corrugated elements of the pipe. Concurrently, the two halves of the pipe are strongly bonded to each other at the diametrically opposed locations where flanges project radially outwardly from opposite sides of the pipe.

Following the RF bonding procedure carried out in the RF bonding and assembly chamber 120, the upper RF heating sleeve 310 is retracted upwardly by retraction of the piston rods 329 into their respective cylinders of the piston and cylinder subassemblies 328. After this, the rotatable post 128 is again extended upwardly from the cylinder 380 so that double-walled pipe is lifted upwardly slightly, and can be retracted from the housing 300 through the opening 304 when the extensible piston rod 124 is retracted into the cylinder arm 126. Following retraction, the position of the expandable mandrel subassembly 330, now carrying the double-walled pipe surrounding the expanded semi-cylindrical quadrants, corresponds to the full line FIG. 1 position of the expandable mandrel subassembly.

The rotatable pipe extractor subassembly 130 is next actuated to rotate the rotatable post 128 about its vertical axis until the cylinder arm 126 and extensible piston rod 124 and expandable mandrel subassembly 330 are brought to the dashed line position illustrated in FIG. 1. The piston rod 124 is then extended to extend the expandable mandrel, carrying, at this time, the double-walled pipe with extending flanges thereon, into the trimmer chamber 132. When the expandable mandrel subassembly 330 and the pipe carried thereon have been located within the trimmer chamber 132, the post 128 is retracted into the cylinder 380 to lower the expandable mandrel subassembly and the pipe carried thereon into a trimming die 390 which is located in the lower portion of a housing 392 forming a part of the trimmer chamber. The trimming die includes a concave central portion which registers with the corrugated outer peripheral portion of the pipe as formed by the corrugated outer element $P_2$.

When the pipe has been lowered on the expandable mandrel subassembly 330 so that it occupies a position in which it rests on the lower trimmer die 390 as shown in FIG. 23, the expandable mandrel subassembly 330 is moved into its retracted status by retracting the piston rod constituted by the hub 354 and shaft 356 into the cylinder 370. This movement, of course, permits the springs 340-346 to draw the frusto-cylindrical quadrants 332-338 of the expandable mandrel subassembly into abutting contact and such retraction permits the piston rod 124 to be retracted into the cylinder arm 126, thus withdrawing the expandable mandrel subassembly 330 from the interior of the pipe.

Mounted within the upper portion of the housing 392 forming a part of the trimmer chamber 132 is a fixed block 394 in which are slidably mounted a pair of shearing blades 396 and 398. The shearing blades 396 and 398 are each provided at its lower end with a sinuous cutting edge of sinusoidal configuration, which edge corresponds in shape with the sinuosity of the corrugations formed in the outer surfaces of the external corrugated elements P₂ located at the top and bottom of the double-walled pipe and forming the outer wall thereof. Each of the shearing blades 396 and 398 is connected to a piston rod 400 and these piston rods are extendable from, and retractable into, a pair of hydraulic cylinders 402 which are mounted on the upper side of the housing 392.

With the pipe having its radially extending flanges thereon resting upon lower shearing die 390, and the expandable mandrel subassembly 330 retracted, the cylinders 402 are actuated to extend piston rods 400 and thereby drive the shearing blades 396 and 398 downwardly against the projecting flanges at opposite sides of the double-wall pipe. The cutting edges of the shearing blades 396 and 398 conform precisely to the sinuous lines of joinder of the radially projecting flanges to the outer sides of the external wall of the pipe, and thus effectively shear the flanges away from the pipe along sinuous lines through these flanges. The shearing forces act, at all points, tangential with respect to the corrugations formed in the corrugated external elements P₂. The result is that the pipe which is thus formed is free of sprue or overhang in the diametric plane previously occupied by the radially projecting flanges, and is a very strong double-wall structure having the external corrugated element P₂ firmly bonded to the internal smooth-walled liner.

The system described, can of course, be employed to make a single-walled pipe having smooth internal and external surfaces, or, if desired, being corrugated over its length. Only minor adjustments are needed in the setting of the various dies in order to accomplish this. Where such fabrication is to be carried out, the spray jets or nozzles employed for spraying the paste containing ferro-magnetic particles on the trough portions of the external element P₁ will be deactivated and not utilized. The pipe halves will still, however, be bonded by the use of radio frequency fusion bonding along a diametric plane where the mated and abutting flanges of the two halves of the pipe are in contact, and for this purpose, the RF heating elements located adjacent these flanges will still be employed, as will the jets utilized to spray the paste containing ferro-magnetic particles along the lines of severance.

From the foregoing description of the invention, it will be perceived that the present invention provides an improved large diameter, double-walled pipe of great strength and fluid tight integrity, and having neat, nearly imperceptible seams formed along longitudinal or axial edges at diametrically opposite sides of the pipe by the fusion bonding process. The invention further extends to the method by which such double-walled pipe is formed, as well as to the methods by which both single-walled, smooth surface large diameter pipe can be fabricated, as well as single-wall corrugated pipe.

Although a preferred embodiment of the invention has been herein described in order to enable those skilled in the art to practice the invention, and to make clear the basic principles which underlie the invention, it will be understood that various changes and innovations in the described methodology, and the structure for carrying it out can be effected without departure from such basic principles. Changes and innovations of this type are therefore deemed to be circumscribed by the spirit and scope of the invention except as the same may be necessarily limited by the appended claims, or reasonable equivalents thereof.

What is claimed is:

1. A synthetic resin pipe comprising:
   a first synthetic resin pipe section, having both internal and external surfaces in the shape of a semi-cylinder;
   a second synthetic resin pipe section having a configuration identical to said first pipe section;
   a flange projecting radially outwardly from the longitudinal edges of each of said sections, said first and second sections being fused together along said flanges to form a cylindrical pipe;
   a first synthetic resin external pipe element having a corrugated body which includes alternating peaks and troughs formed transversely to the longitudinal axis of said element, said element having a transverse cross section which forms a slightly less than 180° arc;
   a second synthetic resin external pipe element having a configuration identical to said first synthetic resin external pipe element, said first and second external pipe elements being fitted over said pipe sections and having the peaks on their radially inner surfaces in contact with the radially outer surface of the pipe sections along the length of each peak, each of the longitudinal edges of said elements being fused to one of said flanges.

2. The pipe of claim 1 wherein the outer edge of each of said flanges is shaped to form alternating peaks and troughs.

3. The pipe of claim 2 wherein the distance from the radially outer surface of each pipe section to any of its associated flange troughs is equal to the thickness of the pipe element body.

4. The pipe of claim 2 wherein the radial distance between the flange troughs and flange peaks is equal to the radial distance between troughs and peaks formed on the radially outer surface of each of said pipe elements.

5. The pipe of claim 2 wherein said pipe element peaks and troughs and said flange peaks and troughs each form a substantially identical sinusoidal pattern.

6. The pipe of claim 1 wherein the peaks on the radially inner surfaces of said pipe elements are fused to the radially outer surfaces of said pipe sections along the length of each peak.

7. The pipe of claim 6 which further includes a particulate susceptor material responsive to high frequency electromagnetic radiation only on the surface of said fused pipe element peaks.

8. The pipe of claim 1 which further includes a particulate susceptor material responsive to high frequency electromagnetic radiation only on the surface of said flange along the fused portions thereof.

9. The pipe of claim 1 wherein said pipe elements include a pair of flanges extending substantially radially outwardly from the longitudinal edges of said elements.

10. The pipe of claim 9 wherein said pipe element flanges are fused to said pipe section flanges.

* * * * *